W. E. WILLIAMS.
METHOD OF MAKING WELDS WITH PIECES OF COATED METAL AND PRODUCT THEREOF.
APPLICATION FILED SEPT. 8, 1913.
1,190,208.
Patented July 4, 1916.
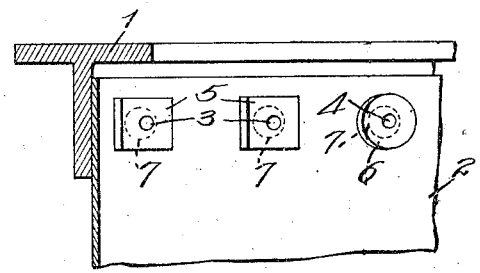
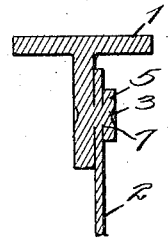
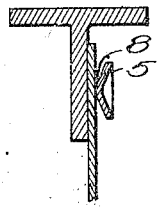
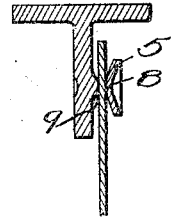
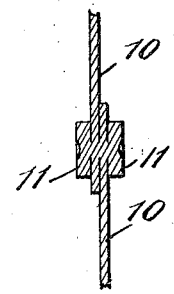
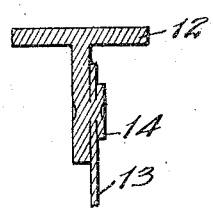
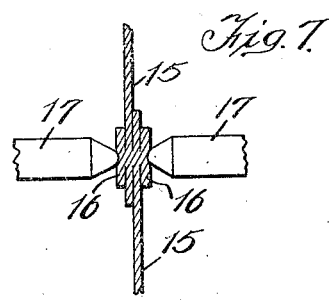
Witnesses:
W. P. Kilroy
Chas. Koursh
Inventor:
W. E. Williams

UNITED STATES PATENT OFFICE.

WILLIAM ERASTUS WILLIAMS, OF CHICAGO, ILLINOIS.

METHOD OF MAKING WELDS WITH PIECES OF COATED METAL AND PRODUCT THEREOF.

1,190,208.  Specification of Letters Patent.   Patented July 4, 1916.

Application filed September 8, 1913. Serial No. 788,642.

*To all whom it may concern:*

Be it known that I, WILLIAM ERASTUS WILLIAMS, a citizen of the United States, residing at Chicago, in the county of Cook and State of Illinois, have invented a new and useful Improvement in Methods of Making Welds with Pieces of Coated Metal and Product Thereof, of which the following is a specification.

My invention relates especially to spot welding, galvanized iron to black iron, or galvanized sheets or pieces to each other in such manner that the burning off of the zinc coating at the welded spot will not permit destructive corrosion to occur at that spot before the time of failure of the normal effective coating on the balance of the sheet undisturbed by the welding.

While I think that my invention is chiefly valuable in connection with galvanized or zinc tin and lead coated metals, it may also be serviceable with other coatings.

My invention is useful in making up iron work, such as car doors, elevator doors and many other places.

It is especially valuable for outside work, which is exposed to moisture and not at all times properly painted.

Spot welding is not new with galvanized iron but it is difficult to make successfully with thin sheets for the zinc coating separating the parts to be welded, being a better conductor of electricity than the iron prevents the generation of the heat at the point of contact where it is most needed, and the weld is effected, if at all, by a large volume of current, or by the heat generated in the iron on either side of the joint, heating by conduction the zinc coating and thus burning it away to permit the iron parts to come together and form the weld. When the weld is thus finally effected, if a good weld is made, the parts must be heated to a higher temperature and over a wider area than is needed to weld uncoated metal and this leaves a spot on the outside larger than the weld, where the protecting coating is destroyed and it is to overcome this injury that my invention relates.

Reference will be had to the accompanying drawings in which,—

Figure 1 is a perspective view of some welds made in accordance with my invention. Fig. 2 is a vertical section of the structure of Fig. 1. Fig. 3 shows the parts assembled and ready to be welded. Fig. 4 shows a view similar to Fig. 3. Fig. 5 shows a weld made with two thin sheets. Fig. 6 is a view similar to Fig. 2, showing an alternative construction. Fig. 7 shows a construction similar to that of Fig. 5, and also shows the position of the electrodes during welding.

I prefer to use electric welding, wherein the resistance to the current produces the heat as is indicated by Fig. 7 but my invention may be used with gas, or other means of heating, if properly handled.

In general, the members to be welded are properly assembled and on one or on each outer face is placed a block which covers and extends on all sides to some distance beyond the area where actual service welding or integral union is desired. Heat is then applied centrally to the block or blocks until the central portion and said members are all welded together, each block thus forming a heavy covering extending beyond that part where the coating has been burned away and itself replacing the lost coating and protecting the denuded part from rapid destructive corrosion.

In the drawings, 1 represents a T-bar to which a thin sheet 2 of coated metal is welded at points 3, 4 covered by blocks 5, 6, some of which are shown as circular while others appear of square outline. The dotted lines 7 indicate areas within which the coatings on the sheet 2 are destroyed. Although the expedient is not indispensable, the meeting surfaces may be provided with salient contact portions 8, 9 which at the outset both concentrate the heat and hold the members slightly apart so that the coating immediately around them is quickly volatilized and driven out, leaving approximately clean metal, which tends to greater uniformity and perfection in the welding.

Fig. 5 shows relatively thick blocks 11 protecting the spot welds which unite two thin sheets 10, while Fig. 6 shows a thin coated sheet 13 welded to a T-bar and provided with a thin protecting block or sheet 14.

Fig. 7 illustrates uniting two sheets 15 by spot welding, thin protecting blocks 16 being used and the whole being pressed together by electrodes 17 which heat the parts as usual.

The sections to which the coated sheet is welded may be either coated, or plain. Welds are made more easily when the sections are plain, for reasons before stated.

The protecting blocks may be coated, or plain, and they may be of iron or other similar easily corroded metal, or they may be of copper or of corrosion resisting metals.

If the blocks are of copper or similar metal, they should be relatively thin, as is indicated by 14 and 16, Figs. 6 and 7, as this metal will heat much slower than the iron and should be thin, in order to facilitate its getting hot enough to stick to the welded point or spot.

If the protecting blocks are of iron, or similar metal, they should be relatively thick so thick that even if they do corrode at the spot where the weld is made, or over the entire surface, that destructive corrosion will consume as much time as amounts to the normal life of the coated sheet, and thus the welded spots will last as long as the sheet itself.

When iron or steel is used for the protecting blocks 5, 6 and 11, the welds are more easily made when using relatively thick blocks, as they develop a large volume of heat which by conduction burns off the coating on sheet 2 more readily than a thin block will do, and thus gets a naked surface between the parts quicker at the points of union than will be arrived at with thin blocks.

What I claim is:—

1. The method of uniting a thin galvanized iron sheet to another metal member which consists in overlapping said sheet upon said member, placing a metal block upon the overlapping portion of the sheet, driving off the sheet's coating under a relatively small central portion only of said block and integrally uniting said portion with the denuded portion of the sheet and the corresponding portion of said member, by means of welding heat.

2. The method of securing a thin sheet of galvanized iron to another metal member, which consists in placing a portion of said sheet between said member and a metal block, driving off the sheet's coating under a small central portion only of the block and integrally uniting said portion with the corresponding portions of the sheet and member, by welding heat; whereby the block serves like a rivet head to hold a portion of the sheet unaffected by heat.

3. The method of securing a galvanized iron sheet to another iron member, which consists in placing the sheet between said member and a metal block, spot welding the sheet, member and block at a point materially distant from all margins of the block, to hold the marginal portions of the block closely upon portions of the sheet surrounding the welding point leaving the exposed portion of the coating uninjured by the welding.

4. The combination with an iron member, of a galvanized iron sheet placed thereon, and a metal block superposed upon the sheet and integrally united, by a relatively small central spot weld, with said sheet and member and pressing around its margin upon a portion of the sheet having its coating uninjured by the welding; whereby the destruction of that portion of the sheet immediately surrounding the welding point would leave the sheet still securely held.

In witness whereof, I have hereunto subscribed my name on this 4th day of September 1913, in the presence of two subscribing witnesses.

WILLIAM ERASTUS WILLIAMS.

Witnesses:
JULIUS JENSEN,
M. JENSEN.